United States Patent

Kazmierczak

(10) Patent No.: US 6,690,541 B2
(45) Date of Patent: Feb. 10, 2004

(54) CLAMPING RING WITH A RADIAL LOAD AND VERTICAL FORCE

(75) Inventor: Frederick Frank Kazmierczak, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 237 days.

(21) Appl. No.: 09/836,907

(22) Filed: Apr. 17, 2001

(65) Prior Publication Data

US 2001/0036038 A1 Nov. 1, 2001

Related U.S. Application Data

(60) Provisional application No. 60/198,169, filed on Apr. 17, 2000.

(51) Int. Cl.⁷ .......................................... G11B 17/038
(52) U.S. Cl. ............................. 360/98.08; 360/99.12
(58) Field of Search ......................... 360/98.08, 99.05, 360/99.12; 403/372

(56) References Cited

U.S. PATENT DOCUMENTS

| | | | | |
|---|---|---|---|---|
| 3,700,271 A | * | 10/1972 | Blaurock et al. ............ | 403/372 |
| 3,776,653 A | * | 12/1973 | Buzogany .................... | 403/372 |
| 3,838,928 A | * | 10/1974 | Blaurock et al. ............ | 403/372 |
| 4,286,894 A | * | 9/1981 | Rongley ...................... | 403/372 |
| 4,764,828 A | * | 8/1988 | Gollbach ................. | 360/98.08 |
| 4,790,683 A | * | 12/1988 | Cramer et al. .............. | 403/372 |
| 4,828,423 A | * | 5/1989 | Cramer et al. .............. | 403/372 |
| 4,981,390 A | * | 1/1991 | Cramer et al. .............. | 403/371 |
| 5,315,463 A | * | 5/1994 | Dew et al. ................ | 360/98.08 |
| 5,493,462 A | * | 2/1996 | Peter ........................ | 360/99.12 |
| 5,548,457 A | * | 8/1996 | Brooks et al. ........... | 360/98.08 |
| 5,615,067 A | | 3/1997 | Jabbari et al. ........... | 360/98.08 |
| 5,659,443 A | | 8/1997 | Berberich ................ | 360/98.06 |
| 5,715,114 A | | 2/1998 | Gotou ..................... | 360/98.08 |
| 5,724,209 A | * | 3/1998 | Dunckley et al. ........ | 360/98.08 |
| 5,880,905 A | | 3/1999 | Kazmierczak et al. ... | 360/98.08 |
| 5,923,498 A | * | 7/1999 | Moir et al. ............... | 360/98.08 |
| 5,973,879 A | | 10/1999 | Raffetto et al. .......... | 360/98.08 |
| 6,055,123 A | | 4/2000 | Kazmierczak et al. ... | 360/98.08 |
| 6,130,801 A | * | 10/2000 | Cheng et al. ............ | 360/98.08 |
| 6,222,700 B1 | * | 4/2001 | Martin et al. ............ | 360/98.08 |
| 6,226,146 B1 | * | 5/2001 | Landess et al. .......... | 360/98.08 |
| 6,288,878 B1 | * | 9/2001 | Misso et al. ............. | 360/264.3 |
| 6,304,412 B1 | * | 10/2001 | Voights ................... | 360/98.08 |
| 6,333,839 B1 | * | 12/2001 | Misso et al. ............. | 360/265.7 |

FOREIGN PATENT DOCUMENTS

WO          WO 93/26006          * 12/1993

\* cited by examiner

*Primary Examiner*—Brian E. Miller
(74) *Attorney, Agent, or Firm*—Merchant & Gould P.C.

(57) ABSTRACT

An apparatus and method for securing an information storage disc within a disc drive incorporates a rotatable spindle hub and a clamping ring. The clamping ring is positioned between an inner edge of the information storage disc and the rotatable spindle hub. The clamping ring is a strip of resilient sheet material and defines a series of serpentine shaped curves that alternatively contact the inner edge of the information storage disc and a sidewall of the rotatable spindle hub. The clamping ring applies a radial force to the information storage disc. In some cases the clamping ring may define a series of equally spaced apart, radially extending, tabs from the top and bottom edges of the clamping ring. The tabs from the top edge contact the top surface of the information storage disc at an inner diameter of the information storage disc. The tabs from the bottom edge contact the bottom surface of the information storage disc at an inner diameter of the information storage disc. Preferably the tabs from the top edge and bottom edge are axially aligned. Tabs provide a vertical clamping load to the information storage disc to accompany the radial load. The clamping ring may extend the entire height of the disc stack and so apply a radial load to the entire disc stack.

17 Claims, 9 Drawing Sheets

CLAMPING RING WITH A RADIAL LOAD AND VERTICAL FORCE

RELATED APPLICATIONS

This application claims the benefit of priority of U.S. Provisional Patent Application Ser. No. 60/198,169 entitled "DISC CLAMP WITH RADIAL LOAD," filed Apr. 17, 2000.

FIELD OF THE INVENTION

This application relates to magnetic disc drives and more particularly to a disc drive clamping ring for securing information storage disc within the disc drive.

BACKGROUND OF THE INVENTION

Disc drives are data storage devices that store digital data in magnetic form on a storage medium on a rotating information storage disc. Modern disc drives include one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g., a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move across the surfaces of the discs.

A typical spindle motor assembly includes a rotating spindle hub journaled to a non-rotating spindle shaft. The spindle hub is cylindrical and has an inside wall that supports a permanent magnet and yoke that forms the rotor of the spindle motor. A disc mounting flange extends from the bottom of the spindle hub to provide a support surface for a plurality of alternatingly stacked information storage discs and discs spacers. A disc clamp is typically secured to the rotating spindle hub via a plurality of screws so as to exert a vertical clamping force onto the disc stack and secure the disc stack to the spindle hub.

A presistant problem within the disc drive industry is having sufficient frictional force within the disc stack, i.e, friction between the information storage discs and disc spacers, the disc clamp and the disc mounting flange, to avoid radial/lateral shifting of the information storage discs (disc slip) relative to the spindle hub. Disc slip results in disturbances in the accuracy of reading and writing information to and from the information storage disc. Disc slip is typically avoided when the frictional forces within the disc stack are greater than the lateral load on the disc stack.

The lateral load on an information storage disc is dependent on both the acceleration speeds of the disc drive and on mechanical shock events felt by the disc drive. Recent developments within the disc drive industry have exacerbated both of these parameters, spindle motor rotation speeds are increasing, and portable laptop computers, more prone to mechanical shock events, have become prevalent. As such, there is a need in the industry to offset increases in the lateral force felt within the disc stack with corresponding increases in the frictional forces felt within the disc stack, thereby avoiding disc slip.

Typically, the frictional force within the disc stack is dependent on the frictional coefficients between the components of the disc stack and the vertical clamping load imparted to the disc stack by the disc clamp. As such, one solution for offsetting increased lateral loads within the disc stack is to increase the vertical clamping load exerted on the disc stack by the disc clamp. Increasing the vertical clamping load on the disc stack generally entails the further increase of torque on the screws that secure the disc clamp to the spindle hub, and so increasing the vertical force exerted by the disc clamp on the inner diameter of the top information storage disc. However, increasing the torque on the screws has several shortcomings, for instance, increased torque results in stripping of the screw hole threads in the spindle hub and galling. Further, because of the industry trend toward decreased information storage disc thickness, the amount of vertical clamping force that can be applied to an information storage disc without causing mechanical distortions has reached its useful limit.

In light of these facts, it is believed that a continued attempt to offset increases in the lateral load on the disc stack through increases in the vertical clamping force on the disc stack is, or soon will, have reached its maximum useful extreme. Therefore, there is a need in the relevant art to overcome increased lateral forces on the disc stack without relying on any substantial increases in the vertical clamping force. Against this backdrop the present invention has been developed.

SUMMARY OF THE INVENTION

The present invention is an apparatus and method for securing information storage discs onto a spindle hub of a spindle motor.

In accordance with a preferred embodiment of the present invention, a spindle hub assembly has a spindle hub that defines a cylindrical sidewall for receiving an information storage disc. The information storage disc has an inner edge that defines a central aperture which is passed over the spindle hub so that the inner edge of the information storage disc is spaced away from the spindle hub sidewall. A serpentine shaped clamping ring is sandwiched between the spindle hub sidewall and the inner edge of the information storage disc for applying a distributed radial load to the information storage disc.

The present invention can further be implemented as a method for securing an information storage disc within a disc drive. The method includes the steps of forming a clamping ring having a predetermined number of serpentine shaped curves, curling the clamping ring to a diameter smaller than a diameter of an inner edge of the information storage disc, positioning the curled clamping ring inside the inner edge of the information storage disc, unfurling the clamping ring to exert an outward force on the inner edge of the information storage disc and positioning the information storage disc on the sidewall of the spindle hub so that the clamping ring exerts a radial load against the information storage disc.

These and various other features as well as advantages which characterize the present invention will be apparent from a reading of the following detailed description and a review of the associated drawings.

DETAILED DESCRIPTION

Figure 1:
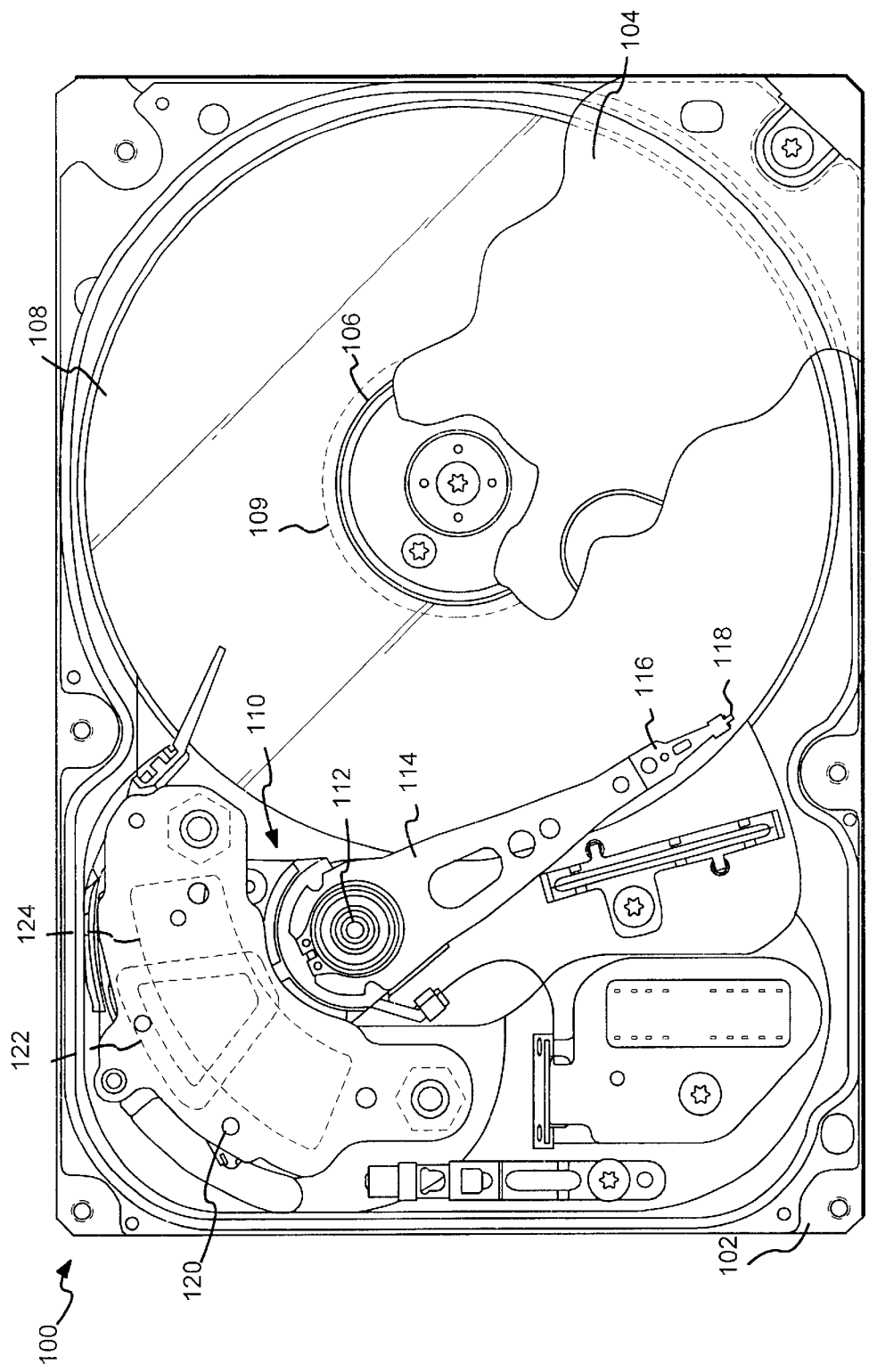
FIG. 1 is a top plan view of a disc drive with a top cover partially removed to illustrate a disc clamping assembly in accordance with a preferred embodiment of the invention.

A disc drive 100 constructed in accordance with a preferred embodiment of the present invention is shown in FIG. 1. The disc drive 100 includes a base plate 102 to which various components of the disc drive 100 are mounted. A top cover 104 cooperates with the base plate 102 to form an internal, sealed environment for the disc drive 100 in a conventional manner. The components include a disc drive spindle motor 106 that rotates one or more information storage discs 108 at a constant high speed. Information is written to and read from tracks 109 on the information storage discs 108 through the use of an actuator assembly 110 which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider (not shown) enabling the head 118 to fly in close proximity above the corresponding surface of the associated information storage disc 108.

The radial position of the heads 118 is controlled through the use of a voice coil motor (VCM) 120, which typically includes a coil 122 attached to the actuator assembly 110, as well as one or more permanent magnets 124 that establish a magnetic field in which the coil 122 is immersed. The controlled application of current to the coil 122 causes magnetic interaction between the permanent magnets 124 and the coil 122 so that the coil 122 moves in accordance with the well known Lorentz relationship. As the coil 122 moves, the actuator assembly 110 pivots about the bearing shaft assembly 112 and the heads 118 are caused to move across the surfaces of the discs 108.

A spindle hub 126 (see FIG. 2) is rotated about the spindle axis of rotation 128 by the spindle motor 106 having a stator core (not shown) around which a motor coil (not shown) is wound. Cooperating with the stator core to rotate the spindle hub 126 is a cylindrical magnet (not shown) typically mounted to an interior surface of the spindle hub 126. When current is supplied to the coil, a magnetic field is established around the relevant pole of the stator core causing torque, and thus rotation, of the spindle hub 126 around the spindle hub axis of rotation.

Figure 2:
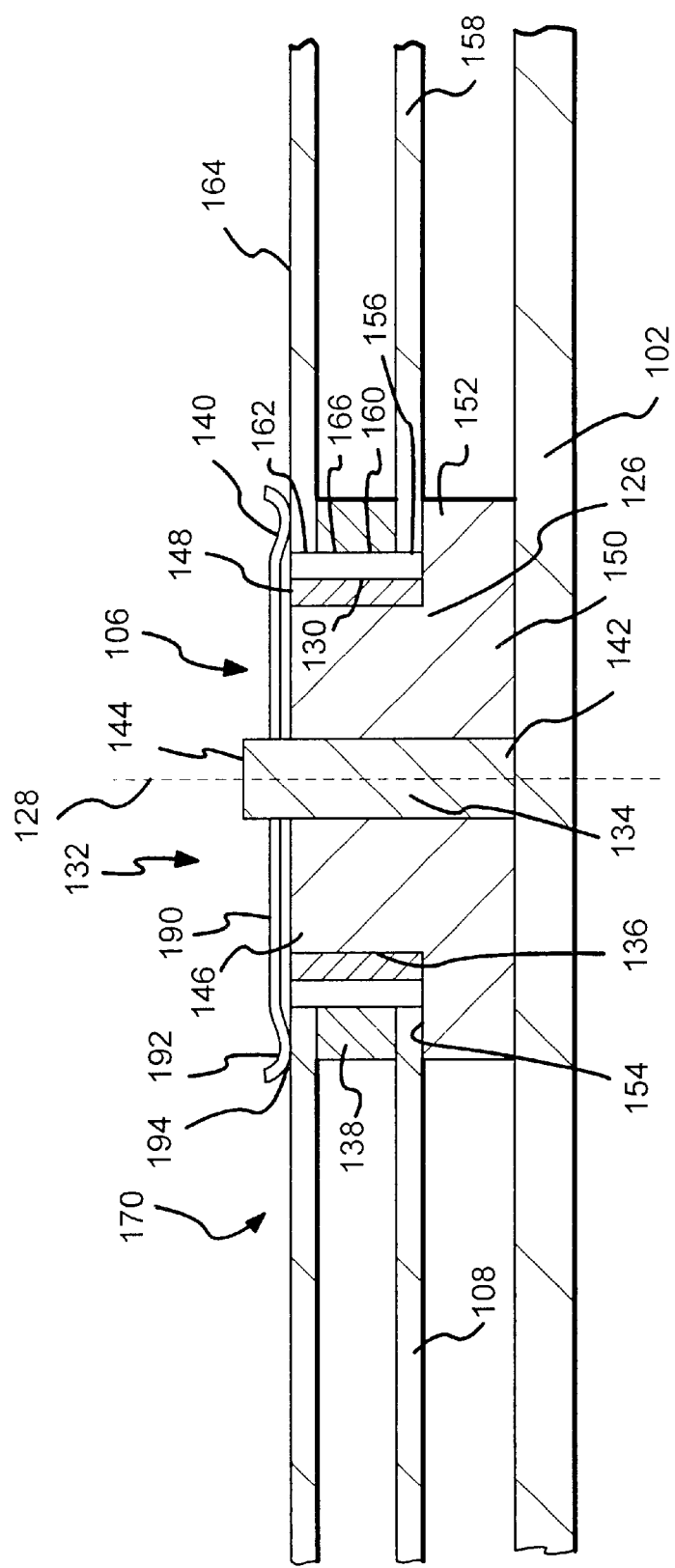
FIG. 2 is a representative sectional view of a spindle hub assembly of the present invention illustrating one embodiment of a clamping ring applying a radial load to a disc stack.

A representative sectional view of one embodiment of a clamping ring 130 on a disc drive spindle hub assembly 132 in accordance with the present invention is shown in FIG. 2. Note that in illustrating embodiments of the clamping ring 130, and its relationship to the spindle hub 126, the spindle hub assembly 132 has a rotatable spindle hub 126 journaled to a stationary spindle shaft 134, however, other spindle hub assembly 132 arrangements are within the scope of the present invention, for example, a hydrodynamic motor having a spindle hub mounted to a bearing sleeve, etc. The key aspect of embodiments of the present invention with respect to the spindle hub 126 are shown in the relationship between the cylindrical sidewall 136 of the spindle hub 126 and the different embodiments of the clamping ring 130, as is discussed in greater detail below.

Referring again to FIG. 2, a disc drive spindle hub assembly 132 in accordance with one embodiment of the present invention includes a spindle shaft 134, a spindle hub 126, one or more information storage discs 108, one or more disc spacers 138, a disc clamp 140 and a clamping ring 130.

In more detail, the generally rectangular shaped base plate 102 acts as a platform for supporting a spindle shaft 134. The spindle shaft 134 has a first end 142 anchored to the base plate 102 and a second end 144 extending upwardly away from the base plate 102 for accepting a rotatable spindle hub 126. The spindle hub 126 is journaled to the spindle shaft 134, a first end of the spindle hub 146 has a top surface 148 for receiving the disc clamp 140 and a second end 150 that defines an annular radial flange 152 having a loading surface 154 for receiving an information storage disc 108. A cylindrical sidewall 136 of the spindle hub 126 provides a smooth surface for engagement with embodiments of the clamping ring 130, as is discussed in greater detail below.

Figure 6:
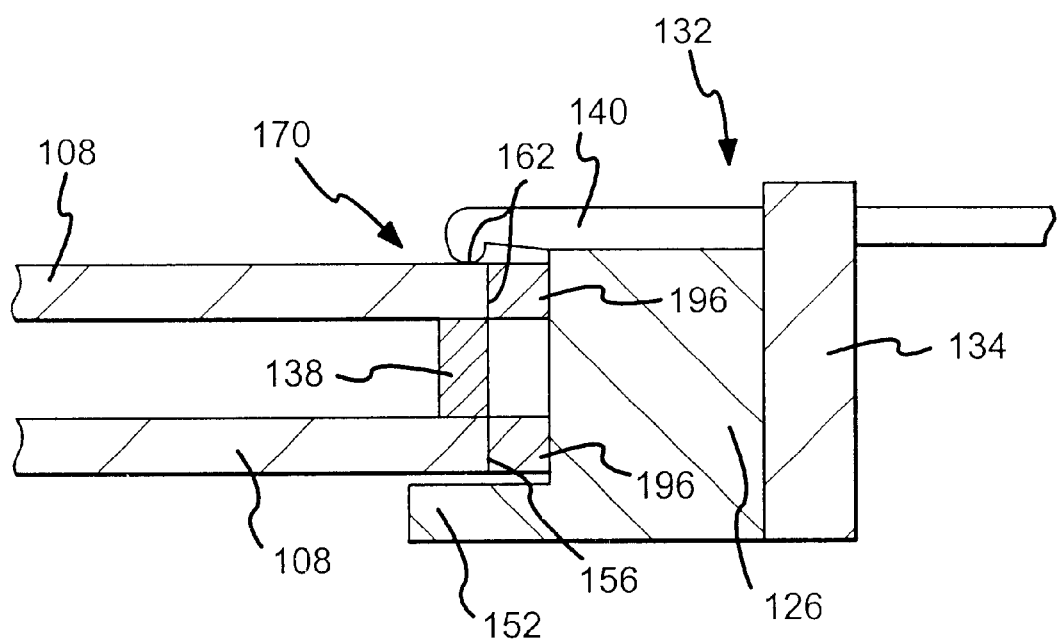
FIG. 6 is a representative cross sectional view of a spindle hub assembly of the present invention illustrating a second embodiment of a clamping ring applying a radial load to an information storage disc.
Figure 9:
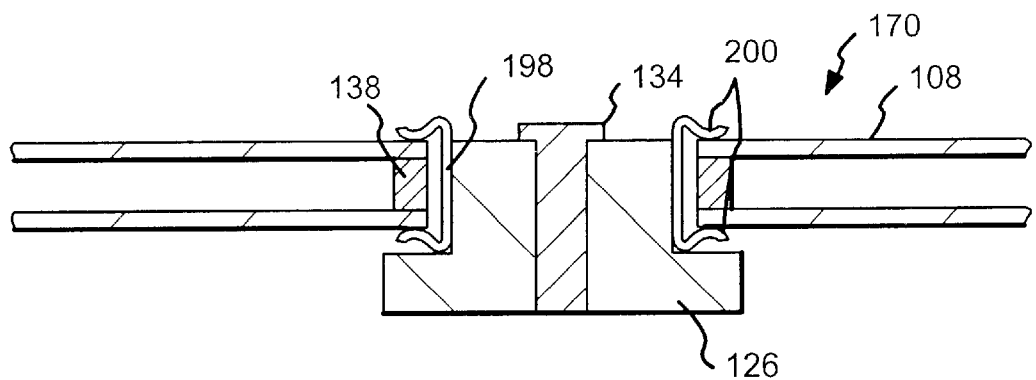
FIG. 9 is a representative cross sectional view of a spindle hub assembly of the present invention illustrating one embodiment of a clamping ring applying both a radial and vertical load to a disc stack.

An inner edge 156 of a first information storage disc 158 defines a central aperture that is mounted around the spindle hub 126 where the first information storage disc sits on the loading surface 154 of the annular radial flange 152. A disc spacer 138 sits on the first information storage disc 158 so that an inner surface 160 of the disc spacer 138 axially aligns with the inner edge 156 of the first information storage disc 158. An inner edge 162 of a second information storage disc 164 defines a central aperture that is mounted on the spindle hub 126 and the inner edge 162 is axially aligned with the inner surface 160 of the disc spacer 138 and inner edge 156 of the first information storage disc 158, the combination of the three surfaces 156, 160, 162 is referred to as an inner disc stack surface 166. Note that while two discs 158, 164 and one disc spacer 138 are shown in FIGS. 2, 6 and 9, it is envisioned that one or more discs and corresponding spacer (s) may be part of the current invention. The number of information storage discs 108 is determined by the predetermined tolerances set for the particular spindle hub assembly 132 and disc drive unit 100.

The inner disc stack surface 166 is substantially parallel with and spaced apart from the cylindrical sidewall 136 of the spindle hub 126. The space between the inner disc stack surface 166 and the sidewall 136 of the spindle hub 126 is substantially centered around the central axis of rotation 128 of the spindle hub 126 and is of a uniform width and height. (see FIG. 3).

An information storage disc 108 is centered on the spindle hub 126 and is resistant to slippage when the frictional forces holding the information storage disc in position exceed the lateral load applied to the information storage disc through spindle motor acceleration or mechanical shock. The frictional forces on an information storage disc are generally dependent on the coefficients of friction between the information storage disc and other relevant components, for example, the disc clamp, disc spacer and radial flange, and the vertical clamping load imparted on the information storage disc by the disc clamp 140. The clamping ring 130 of the present invention applies a radial load to the information storage discs by distributing an outward force against the inner edge 156, 162 of the information storage disc. The radial load on the information storage disc causes an increase in the frictional forces on the information storage disc. The increased radial load allows for a corresponding increase in the lateral loads applied to the information storage disc, for example, higher speed spindle motors and more prevalent shock events, before a disc slip will occur at the information storage disc 108. Alternatively, the increased radial load on the information storage disc allows for a reduction in the required vertical clamping force on the discs, thus allowing for the use of low cost, smaller disc clamps.

Figure 3:
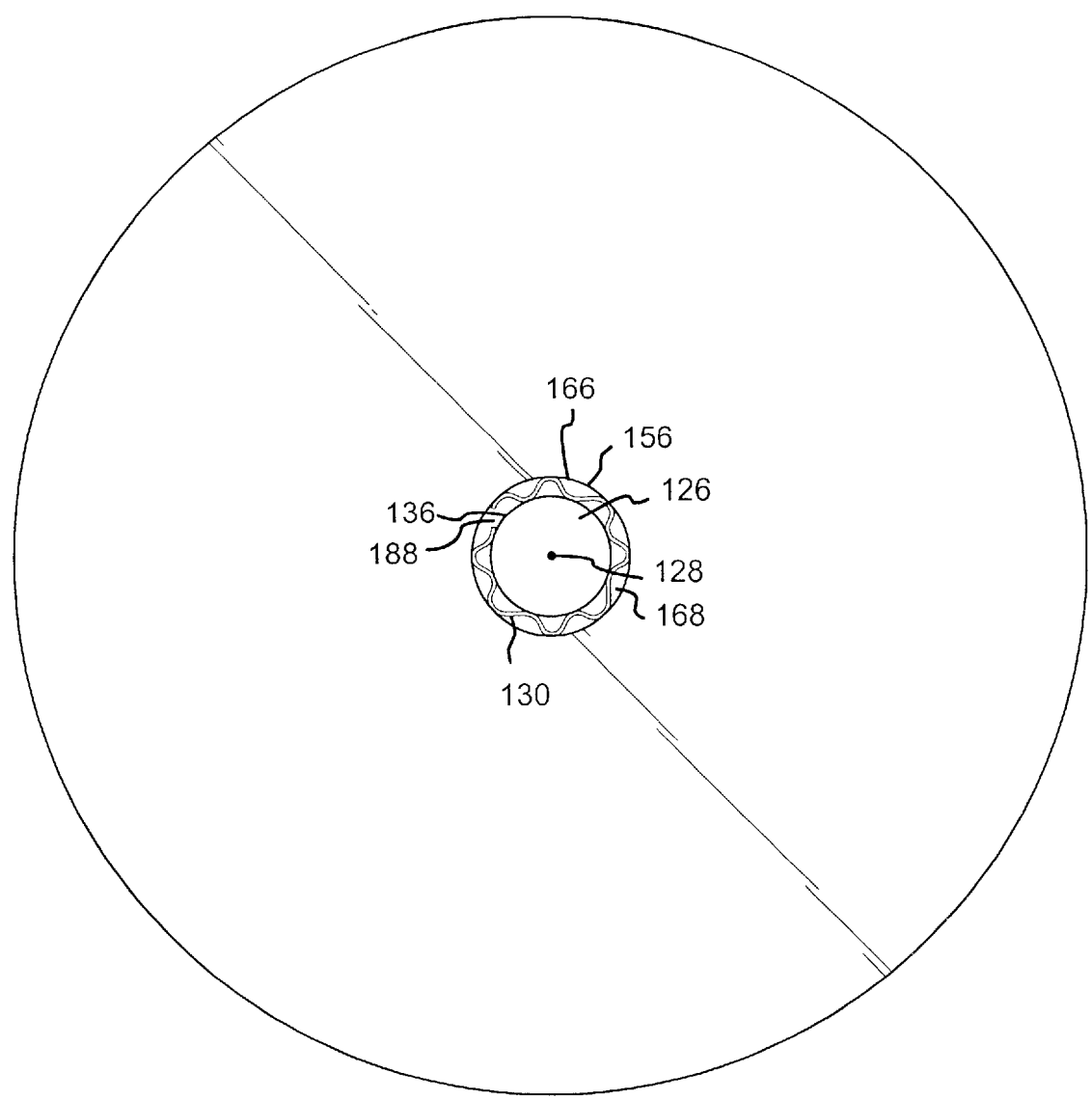
FIG. 3 is a top view of a spindle hub assembly, in the absence of the disc clamp, in accordance with one embodiment of the present invention showing the relationship between the clamping ring, spindle hub and disc stack.

A clamping ring 130 in accordance with one preferred embodiment of the present invention is shown in FIGS. 2–5. As shown in FIGS. 2 and 3, the clamping ring 130 is positioned in the space 168 between the inner disc stack surface 166 and the sidewall 136 of the spindle hub 126. The positioned clamping ring 130 restrains the disc stack 170 from radial movement by exerting an equal and opposite force against the inner disc stack surface 166 and the cylindrical sidewall 136 of the spindle hub 126.

Figure 4:
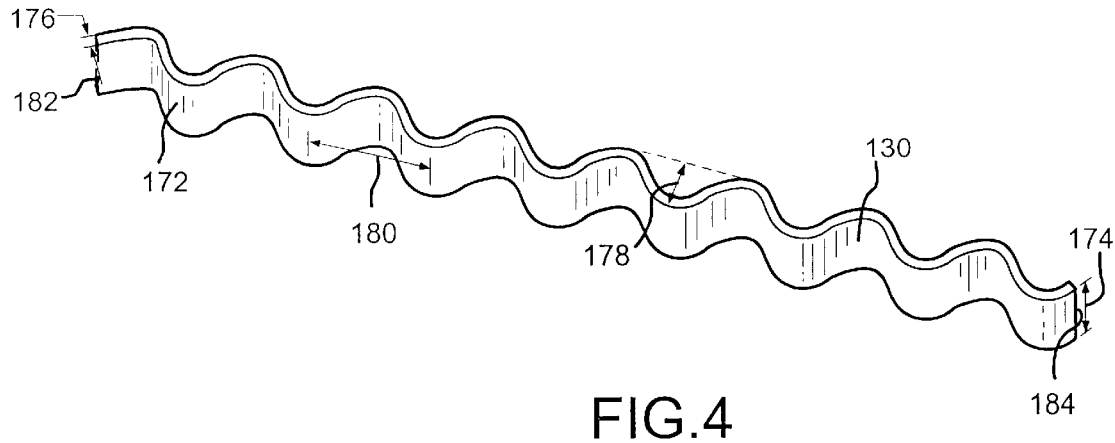
FIG. 4 is a perspective view of an unformed clamping ring in accordance with one embodiment of the present invention.

Referring to FIG. 4, a perspective view of an unformed or uncompressed clamping ring 130 in accordance with one embodiment of the present invention is shown. Preferably, the uncompressed clamping ring 130 is an elongated strip of resilient material having two ends 182 and 184, and defining a series of serpentine or "S" shaped curves 172. The undulating pattern of curves 172 in the strip is formed or pressed into the strip of material by means well known in the art. The total length of the uncompressed clamping ring 130 is less than the length of the circumference of the inner edge 156, 162 of an information storage disc within the disc stack 170, preferably being from 1 to 5 mm, and most preferably from 2 to 4 mm. The vertical height 174 of the clamping ring 130 for the present embodiment is the approximate height of the inner disc stack surface 166 of the disc drive. Note, however, that it is envisioned that embodiments of the clamping ring 130 may be a fraction of the height of the inner disc stack surface 166, as long as the clamping ring 130 applies an appropriate radial force to the inner disc stack surface 166. Finally, the thickness 176 of the strip material of the clamping ring is preferably from 0.2 to 0.5 mm.

Typically, an unformed clamping ring 130 has from 4 to 12 serpentine curves 172 formed over the entire length of the strip and most preferably has from 6 to 8 curves 172 over the length of the strip. A typical range of curve widths 178 i.e., two times the amplitude of a curve, is from 0.1 to 1 millimeters (mm) and preferably from 0.2 to 0.5 mm. Note that the width of the curves must be sufficient to exert a radial load against the inner disc stack surface/inner edge of an information storage disc, but must not cause undue stress or scratching on the spindle hub or information storage discs.

A typical range of lateral lengths 180 for each curve 172, i.e., the "wavelength," is from 10 to 30 mm, and preferably from 15 to 20 mm. In preferred embodiments, the width 178 and length 180 of each curve 172 along the clamping ring 130 is substantially equal to any other curve 172 along the clamping ring 130.

Clamping rings 130 of the present invention are typically made from a strip of resilient sheet material. Examples of such material include, but are not limited to, sheet metal, e.g., stainless spring steel sheet metal, and non-outgassing plastics.

Figure 5:
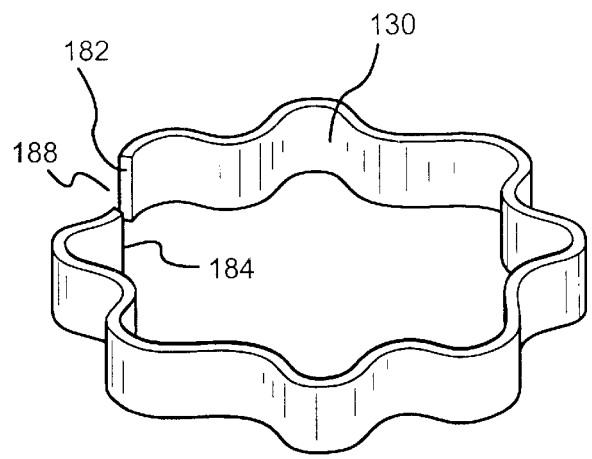
FIG. 5 is a perspective view of a curled clamping ring in accordance with one embodiment of the present invention.

As shown in FIG. 5, an unformed clamping ring is curled or spiraled into a ring that fits inside the diameter of the inner disc stack surface 166. The unformed clamping ring is rolled so that the two ends 182 and 184 of the clamping ring 130 overlap each other by approximately one quarter of the length of the strip. The rolled strip is released inside the diameter of the inner disc stack surface and allowed to unfurl leaving a gap 188 between the two ends of the curled clamping ring. (see FIG. 2) The curves of the ring alternate between engaging the inner disc stack surface 166 and the sidewall of the spindle hub to distribute an outward radial load on the disc stack. (see FIG. 3) The force is the result of the clamping ring's relatively large "unfurling" force. The clamping ring is formed undersized relative to the diameter of the sidewall 136 of the spindle hub 126 and so frictionally engages the sidewall surface when the clamping ring/ information storage disc are positioned on the sidewall.

In addition to the clamping ring, a disc clamp 140 having a centrally located aperture, an inner annular hub contact portion 190, and an outer periphery 192 that further defines a downward projecting peripheral edge 194 is loaded on the spindle hub 126 to exert a downward vertical clamping force on the disc stack 170. (see FIG. 2). The disc clamp's inner annular spindle hub contact portion 194 engages the top surface 148 of the spindle hub 126 while the downwardly projecting peripheral edge 194 spans across the space 168 between the inner disc stack surface 166 and the sidewall 136 of the spindle hub 126 to contact the information storage disc at a position adjacent the inner edge 162 of the second information storage disc 164 and directly above and in-line with the disc spacer 138 and radial flange 152 of the spindle hub 126.

Because the clamping ring applies a radial load to the disc stack 170 there are situations where a reduced vertical clamping load is sufficient to secure the disc stack to the spindle hub. In such cases, a smaller, less expensive, disc clamp may be used to apply the vertical load, as long as the combined vertical and radial loads on the disc stack are larger than the applied lateral load of the spindle motor and mechanical shock events.

At least three forces act on the disc stack to prevent disc slip in the operating disc drive in accordance with the embodiments of the clamping ring shown in FIGS. 2–5: the downward vertical clamping imparted by the disc clamp, the frictional coefficients between each touching component within the disc stack, and the radial load imparted by the clamping ring.

Another embodiment of the clamping ring 196 in accordance with the present invention is shown in FIG. 6. In this embodiment, the clamping ring 196 is approximatley the vertical height of a single information storage disc 108 and sits around the inner edge 156, 162 of the information storage disc within the disc stack 170. In other aspects, the clamping ring 196 is the same or similar to the clamping ring 130 embodiments described in FIGS. 2–5. Clamping rings are positioned around the inner edge of an information storage disc which are then mounted on the cylindrical sidewall of the spindle hub. Within any spindle hub assembly 132, one or more of the mounted information storage discs 108 may have a clamping ring 196 applying a radial load to that information storage disc. The spindle hub assembly 132 maintains the disc spacer 138, radial flange 152 and disc clamp 140 so as to maintain the proper spacing and vertical clamping load on the clamping ring/information storage disc assembly.

Figure 7:
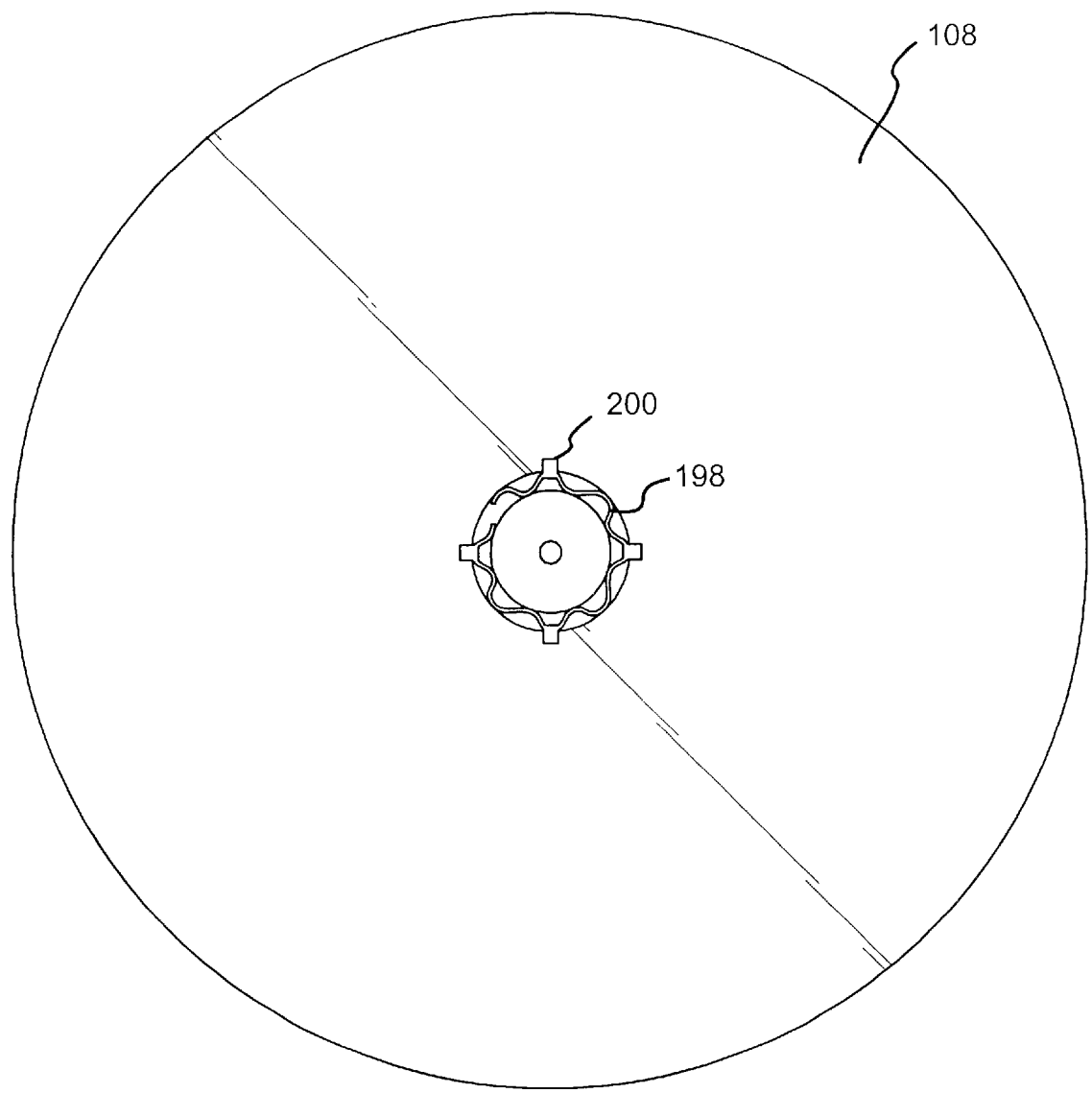
FIG. 7 is a top view of a spindle hub assembly, in the absence of the disc clamp, in accordance with another embodiment of the present invention showing the relationship between the radially extending tabs of the clamping ring and an information storage disc.
Figure 8:
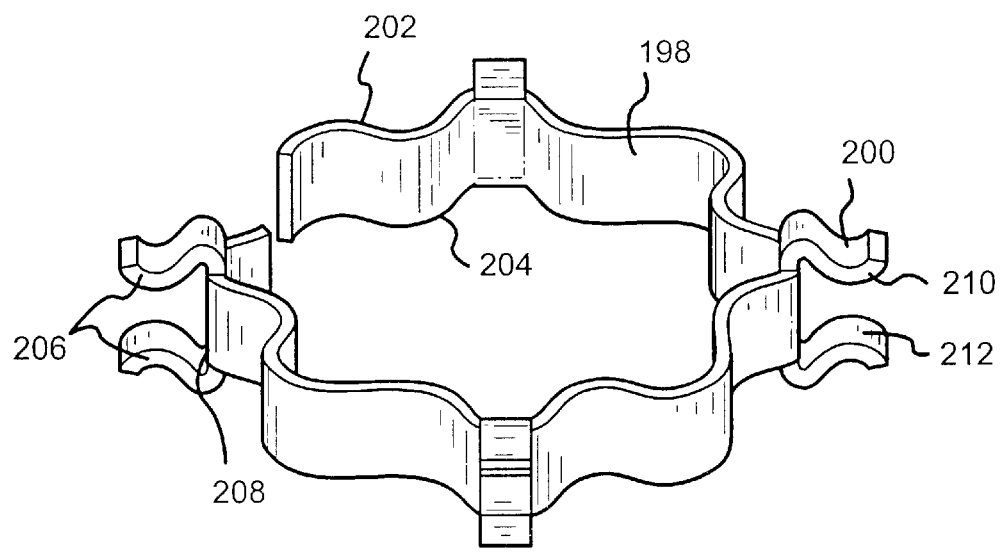
FIG. 8 is a perspective view of a curled clamping ring having tabs in accordance with one embodiment of the present invention.

Another embodiment of the clamping ring 198 in accordance with the present invention is illustrated in FIGS. 7–9. As shown in FIG. 8, a series of tabs 200 extend radially outward from a first and second edges, 202 and 204 respectively, of the clamping ring 198. Each tab 200 positioned on the first edge 202 is bent downward and has a downward bias, and each tab 200 on the second edge 204 is bent upward and has an upward bias. Typically, tab pairs 206 are formed so that one tab 200 from the first edge 202 and one tab 200 from the second edge 204 are axially aligned. Each member of a tab pair 206 is biased toward the other member of the pair and so forms a clip for securing the disc stack 170 or information storage disc (see below) through a vertical clamping force. (see FIG. 8). In a preferred embodiment, the tabs 200 are positioned along the two edges 202, 204 at appropriate curve peaks 208 of the outward (disc stack) facing curves and are equally spaced apart from each other to provide symmetry to the clamping ring.

Tabs 200 in accordance with the present invention are typically flat and of a sufficient length to exert a vertical clamping force on an inner diameter of the disc stack and/or inner diameter of an information storage disc. Typical tab 200 lengths are from 0.5 to 2.0 mm, and preferably from 1 to 1.5 mm. Each tab 200 has a distal end 210 having an information storage disc contact surface 212 for contacting an information storage disc 108. Although four tab pairs 206 are shown along the length of a clamping ring in the figures, other embodiments of the clamping ring are envisioned to have three or more tab pairs 206, with the preferable number being from four to eight tab pairs per clamping ring. Note that the greater the number of tab pairs along the clamping ring 198, the more effective the clamping ring 198 will be at imparting a substantially uniform vertical load on the disc stack and/or information storage discs.

In another embodiment of the present invention, the tab pairs 206 provide sufficient vertical clamping force to eliminate the need for a disc clamp 140 and radial flange 152 on the spindle hub assembly. The clamping ring is approximatley the vertical height of the disc stack having tab pairs that extend from the two edges of the ring. The first information storage disc 158 is received by the tab members extending from the second edge 204 of the clamping ring 198, a disc spacer separates the information storage discs, and the second information storage disc is compressed by tab members extending from the first edge 202 of the clamping ring. The clamping ring exerts a radial load to position the disc stack on the sidewall of the spindle hub while the tab pairs on the clamping ring distribute a vertical load on the disc stack, eliminating the need for a disc clamp and flange.

Figure 10:
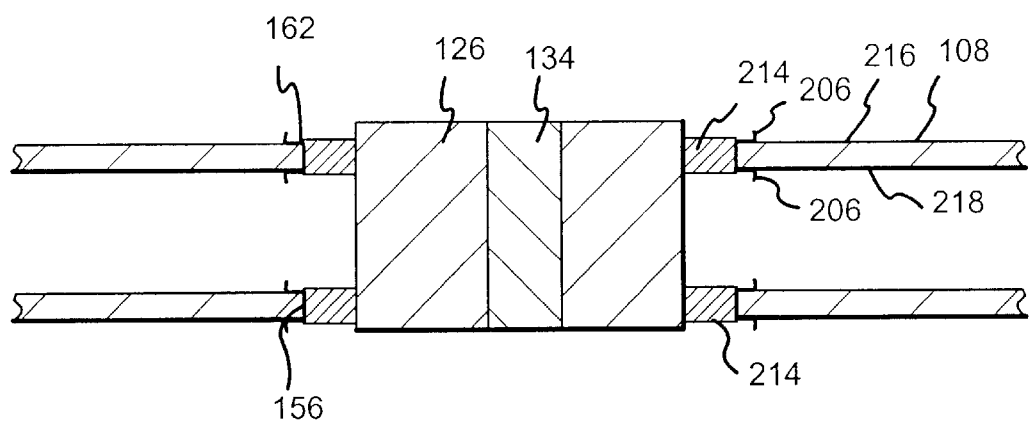
FIG. 10 is a representative cross sectional view of a spindle hub assembly of the present invention illustrating one embodiment of a clamping ring applying both a radial and vertical load to a pair of information storage disc.

In another embodiment of the present invention, a clamping ring 214 is approximately the vertical height of a single information storage disc and has radially extending tab pairs 206, as shown in FIG. 10. The clamping ring 214 is curled and positioned around the inner edge of an information storage disc. Release of the curled clamping ring 214 results in the clamping ring unfurling around the inner diameter 156, 162 of the information storage disc allowing the tab pairs 206 to snap onto the top and bottom surfaces, 216 and 218 respectively, of the information storage disc 108. As shown in FIG. 10, the information storage disc 108 is mounted on the spindle hub 126 and receives both a radial and vertical load from the clamping ring 214. No disc clamp, disc spacers or radial flange are required to secure each individual information storage disc to the spindle hub.

Alternatively, the clamping rings 214 are positioned along the inside of each information storage disc in the disc stack where the spindle hub assembly continues to have a disc spacer(s) to separate the information storage discs, and includes both a radial flange 152 for receiving the bottom information storage disc and a disc clamp 140 for applying an additional vertical clamping force to the disc stack. Tab pairs 206 snap into place on the top and bottom surfaces of each information storage disc and apply a vertical clamping load on each information storage disc. Indentations may be formed in the top and bottom surfaces of the disc spacer as well as in the information storage disc loading surface on the annular shaped radial flange to accommodate the tabs. As such, the tab pairs 206 augment the vertical clamping force applied to the information storage disc by the disc clamp 140.

In another embodiment of the present invention, the clamping ring has radially extending tab pairs that engage the information storage disc at an inner diameter and a series of vertically extending tabs from either the first or second edge of the clamping ring. (not shown). Each vertically extending tab is of a predetermined length and provides spacing dimensions regarding the installation of the information storage disc on the sidewall of the spindle hub. The information storage disc is loaded on the spindle hub in the absence of a disc spacer, radial flange or disc clamp. The clamping ring applies both a vertical and radial load to the information storage disc, as previously discussed. The vertical tabs on the clamping ring extend either upward or downward from the a relevant edge of the clamping ring so as to contact the alternative edge of a second clamping ring, and thereby provide spacing information between the two information storage discs. The vertically extending tabs preferably extend in a direction substantially parallel to the sidewall of the spindle hub.

Finally, in an alternative embodiment of the clamping ring, the strip of resilient material defines a straight or un-curved section interposed between each serpentine curve along the length of the clamping ring (not shown). Extending radially from every, or every other, straight section of strip is a tab pair. Preferably, each tab pair is equally spaced apart from another tab pair along the clamping ring. The tabs in this embodiment are slightly longer than the other tab embodiments so as to reach the inner diameter of the inner disc stack surface or inner diameter of an information storage disc.

In general, clamping rings of the present invention are assembled inside the inner disc stack surface or inner edge of an information storage disc using a preloading device. The tooling places the clamping ring around the inside of the target surface, where the curled ring is released/unfurled. For embodiments having the tab feature, the release of the clamping ring causes one series of tabs to snap onto the top surface of the top information storage disc and the other series of tabs to snap onto the bottom surface of the bottom information storage disc. In alternative embodiments, release of the clamping ring causes one set of members of the tab pair to snap onto the top surface of the information storage disc and the other set of members to snap onto the bottom surface of the same information storage disc. The unfurled clamping ring exerts the radial force against the target inner surface. Note that due to the curled clamp rings undersized shape relative to the sidewall of the spindle hub, the preloaded disc stack is squeezed over the sidewall of the spindle hub to its appropriate position.

Figure 11:
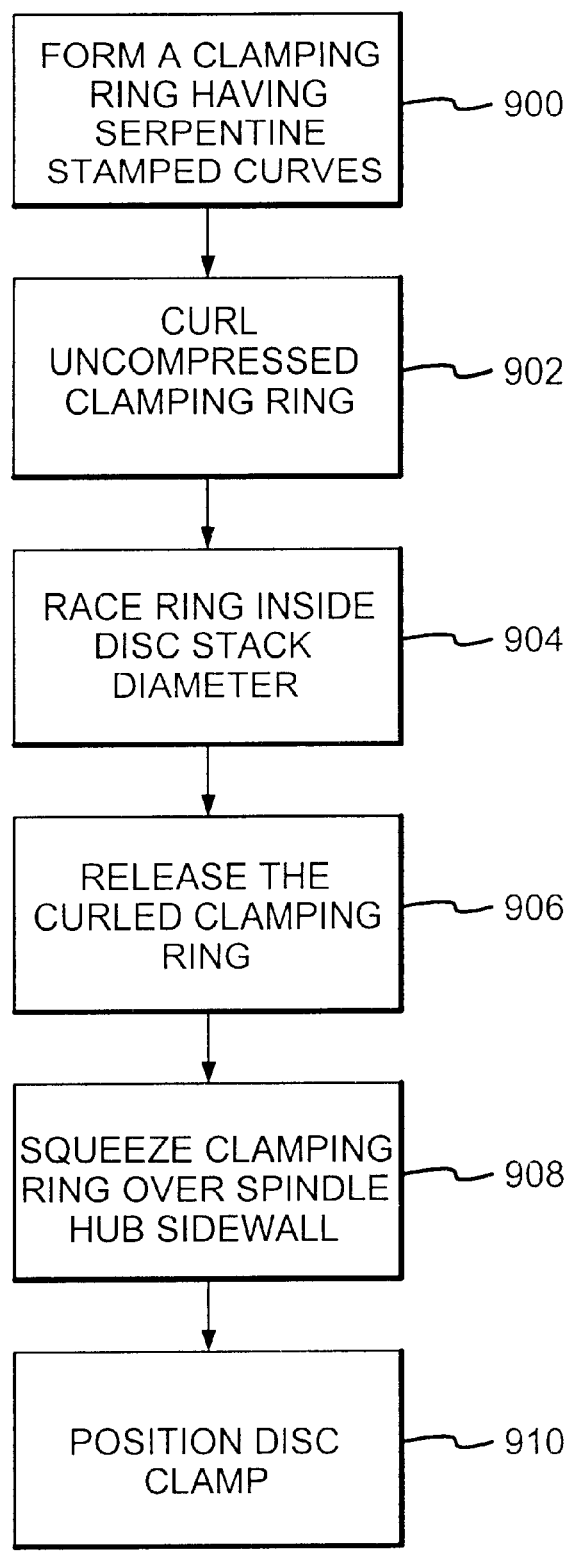
FIG. 11 is a flow diagram showing the steps for assembling a spindle hub assembly in accordance with a preferred embodiment of the present invention.

FIG. 11 is a flow diagram showing the steps for securing a disc stack onto a spindle hub. In Operation 900, a preset sized piece of sheet metal, preferably stainless spring steel, is formed with a series of serpentine curves of sufficient length and width to provide a radial load to the inside of a disc stack surface. In Operation 902, the strip of material having the undulating curves is curled or spiraled into a ring, and in Operation 904 the curled clamping ring is placed inside the inner disc stack surface of the disc stack by a preload device. In Operation 906, the curled clamping ring is released from the preload device so that the clamping ring unfurls and exerts a radial load against the inner disc stack surface. For embodiments having tab pairs, the tab pairs snap into place to exert a vertical clamping force on the disc stack. In Operation 908, the undersized clamping ring is squeezed over the sidewall surface of the spindle hub so that the clamping ring is sandwiched between the inner disc stack surface and the sidewall of the spindle hub. In Operation 910, a disc clamp is optionally secured to the top surface of the spindle hub to exert a vertical downward force on the disc stack. The above method equally applies to securing a single information storage disc onto a spindle hub using the appropriate embodiment of the clamping ring.

In summary, the preferred embodiment of the invention described herein is directed to an apparatus and method for securing a disc stack or individual information storage disc to a spindle hub.

One preferred embodiment of the invention described herein is a disc drive spindle hub assembly (such as 132) having a spindle hub (such as 126), an information storage disc (such as 108) and a clamping ring (such as 196). The spindle hub has a cylindrical sidewall (such as 136). The information storage disc (such as 108) has an inner edge (such as 156 or 162) that defines a central aperture, where the spindle hub (such as 126) passes through the central aperture of the information storage disc so that the inner edge (such as 156 or 162) is spaced away from the spindle hub sidewall (such as 136). A substantially serpentine shaped clamping ring (such as 196) is sandwiched between the spindle hub sidewall (such as 136) and the inner edge (such as 156 or 162) of the information storage disc applying a distributed radial load to the information storage disc (such as 108).

In another preferred embodiment of the present invention, the clamping ring (such as 196) is a strip of resilient material passing alternatingly between the sidewall (such as 136) of the spindle hub (such as 126) and the inner edge (such as 156 or 162) of the information storage disc (such as 108).

In another preferred embodiment of the present invention, the disc drive spindle hub assembly (such as 132) includes a disc clamp (such as 140) attached to a top surface (such as 148) of the spindle hub (such as 126), the disc clamp applying a downward vertical clamping load on the information storage disc (such as 108).

In another preferred embodiment of the present invention, the spindle hub assembly (such as 132) includes a second information storage disc (such as 164) having an inner edge (such as 162) that defines a central aperture, and a disc spacer (such as 138). The disc spacer is interposed between the aforesaid first information storage disc (such as 108 or 158) and the second information storage disc (such as 164). The disc spacer (such as 138) has an inner surface (such as 160). The inner edges of the first and second information storage discs and the inner surface (such as 160) of the disc spacer form an axially aligned inner disc stack surface (such as 166), where the clamping ring (such as 130) is approximately a height that corresponds to the inner disc stack surface (such as 166) and distributes a radial load against the inner disc stack surface (such as 166).

In another preferred embodiment of the present invention, the clamping ring (such as 214) has a first edge (such as 202) and a second edge (such as 204). The first edge (such as 202) and second edge (such as 204) have a series of three or more outwardly extending radial tabs (such as 200), where the tabs (such as 200) exert a vertical clamping force on the information storage disc (such as 108). In some cases, the clamping ring (such as 214) has from three to eight radially extending tabs (such as 200). In other preferred embodiments, the first and second edges (such as 202 and 204, respectively) have an equal number of tabs (such as 200), where each tab on the first edge is axially aligned with a tab on the second edge, thereby forming tab pairs (such as 206). Additionally, some embodiments of the clamping ring have tab pairs (such as 206) that are equally spaced from each other.

In another preferred embodiment of the present invention, the clamping ring (such as 130, 196, 198 and 214) is formed from sheet metal, and in some cases, from stainless spring steel.

A further exemplary preferred embodiment of the present invention is a clamping ring (such as 196 and 214) for mounting an information storage disc (such as 108) to a spindle hub (such as 126). The clamping ring is a strip of resilient sheet material having a series of serpentine shaped curves (such as 172), the clamping ring sandwiched between the information storage disc and the spindle hub and where the serpentine curves apply a radial load to the information storage disc while mounting the information storage disc to the spindle hub.

In another preferred embodiment of the present invention, the strip of resilient sheet material has a series of radially extending tabs (such as 200) from both a first edge (such as 202) and a second edge (such as 204), each tab contacts, and applies a vertical load, to an information storage disc (such as 108). In some instances, the number of tabs extending from the first edge and second edge are equal and each tab on the first edge is axially aligned with a tab on the second edge.

Another exemplary preferred embodiment of the present invention is a method for securing an information storage disc within a disc drive. The method includes the steps of forming a clamping ring having a predetermined number of serpentine shaped curves (such as in step 900), curling the clamping ring to a diameter smaller than a diameter of an inner edge of the information storage disc (such as in step 902), positioning the curled clamping ring inside the inner edge of the information storage disc (such as in step 904), unfurling the clamping ring so that it engages the inner edge of the information storage disc (such as in step 906), and positioning the information storage disc on the sidewall of the spindle hub (such as in step 908).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. Accordingly, all such modifications, changes and alternatives are encompassed in the spirit of the invention disclosed and as defined in the appended claims.

What is claimed is:

1. A disc drive spindle hub assembly comprising:

a spindle hub having a cylindrical sidewall;

an information storage disc having an inner edge defining a central aperture, the spindle hub passing through the aperture so that the inner edge is spaced away from the spindle hub sidewall; and a substantially radially serpentine shaped clamping ring sandwiched between the spindle hub sidewall and the inner edge of the information storage disc for applying a distributed radial load to the information storage disc, the clamping ring having a plurality of radial tabs extending over the inner edge of the disc wherein the tabs exert a vertical clamping force on the disc.

2. The disc drive spindle hub assembly of claim 1 wherein the clamping ring is a strip of resilient sheet material passing alternatingly between the sidewall of the spindle hub and the inner edge of the information storage disc.

3. The disc drive spindle hub assembly of claim 1 further comprising a disc clamp attached to a top surface of the spindle hub wherein the disc clamp exerts a downward vertical clamping load on the information storage disc.

4. The disc drive spindle hub assembly of claim 3 further comprising a second information storage disc having an inner edge that defines a central aperture and a disc spacer having an inner surface positioned between the aforesaid first information storage disc and the second information storage disc, the inner edge of the first and second information storage discs and the inner surface of the disc spacer forming an axially aligned inner disc stack surface and wherein the clamping ring has a height that corresponds to the inner disc stack surface and applies a radial load against the inner disc stack surface.

5. The disc drive spindle hub assembly of claim 1 wherein the clamping ring has a first edge and a second edge, the first edge having a series of three or more outwardly extending radial tabs and the second edge having a series of three or more outwardly extending radial tabs, wherein the tabs on the first edge and second edge exert a vertical clamping force on the information storage disc.

6. The disc drive spindle hub assembly of claim 5 wherein the first edge and second edge each have from three to eight radially extending tabs.

7. The disc drive spindle hub assembly of claim 5 wherein the first edge and second edge each have an equal number of radially extending tabs, each tab on the first edge being axially aligned with a tab on the second edge of the clamping ring, forming a tab pair.

8. The disc drive spindle hub assembly of claim 7 wherein each tab pair is equally spaced from another tab pair.

9. The disc drive spindle hub assembly of claim 1 wherein the clamping ring is formed from sheet metal.

10. The disc drive spindle hub assembly of claim 9 wherein the sheet metal is stainless spring steel.

11. A clamping ring for use in mounting an information storage disc to a spindle hub sidewall in a disc drive spindle hub assembly, the clamping ring comprising:

a strip of resilient sheet material formed into a ring having a series of radial serpentine shaped curves and a plurality of outwardly extending tabs, wherein the clamping ring is adapted to be sandwiched between the spindle hub sidewall and an inner edge of the information storage disc, and the tabs exert a vertical force against the disc, and wherein the serpentine curves apply a radial load to the inner edge of an information storage disc while mounting the information storage disc to the spindle hub when the ring is positioned around the spindle hub.

12. The clamping ring of claim 11 wherein the strip of material has a series of radially extending tabs from both a first edge and a second edge of the strip, and wherein the radially extending tabs contact the information storage disc and apply a vertical load on the information storage disc.

13. The clamping ring of claim 12 wherein an equal number of tabs extend from the first edge of the strip as extend from the second edge of the strip and wherein each tab on the first edge is axially aligned with a tab on the second edge.

14. The clamping ring of claim 11 wherein the strip of resilient sheet material is formed from sheet metal.

15. The clamping ring of claim 14 wherein the sheet metal is stainless spring steel.

16. A method of securing an information storage disc within a disc drive, the method comprising steps of:

(a). forming a clamping ring having a predetermined number of serpentine shaped curves and a plurality of outwardly extending tabs;

(b). curling the clamping ring to a diameter smaller than a diameter of an inner edge of the information storage disc;

(c). positioning the curled clamping ring inside the inner edge of the information storage disc;

(d). unfurling the clamping ring against the inner edge of the information storage disc with the tabs extending over the inner edge of the disc so as to exert a vertical force against the disc; and (e). positioning the clamping ring engaged information storage disc on the sidewall of the spindle hub.

17. A disc drive spindle hub assembly comprising:

an information storage disc mounted on a cylindrical sidewall of a spindle hub; and radially serpentine means for providing a radial load to an inner edge of the mounted information storage disc and a vertical force against the disc.

\* \* \* \* \*